(No Model.)

J. C. WHISMAN & L. F. GERDING.
LUBRICATOR FOR AXLES.

No. 552,564.  Patented Jan. 7, 1896.

WITNESSES:
I. H. Walker
Theo. G. Hoster

INVENTORS
J. C. Whisman
L. F. Gerding
BY Munn & Co.
ATTORNEYS.

UNITED STATES PATENT OFFICE.

JAMES C. WHISMAN AND LOUIS F. GERDING, OF ST. JOSEPH, MISSOURI.

LUBRICATOR FOR AXLES.

SPECIFICATION forming part of Letters Patent No. 552,564, dated January 7, 1896.

Application filed May 8, 1895. Serial No. 548,532. (No model.)

*To all whom it may concern:*

Be it known that we, JAMES C. WHISMAN and LOUIS F. GERDING, of St. Joseph, in the county of Buchanan and State of Missouri, have invented a new and Improved Lubricator for Axles, Shafts, &c., of which the following is a full, clear, and exact description.

The object of the invention is to provide a new and improved lubricator which is simple and durable in construction, very effective in operation, and arranged to facilitate the application of the lubricant to vehicle axles, shafts, journals, &c., without removing the wheel from the axle, and thus dispensing with jacks and other appliances usually employed for lifting the wagon to remove the wheel and apply the lubricant to the axle.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1:
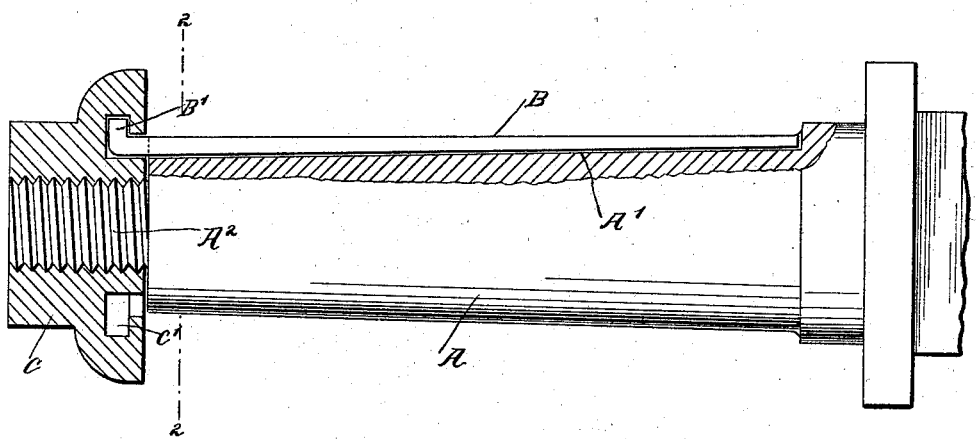
Figure 2:
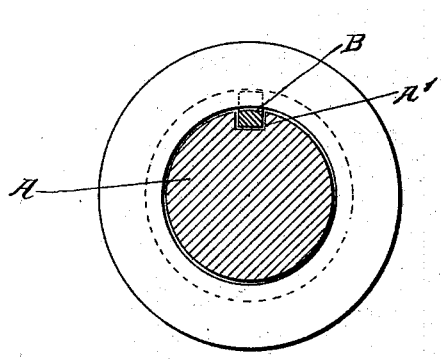
Figure 3:
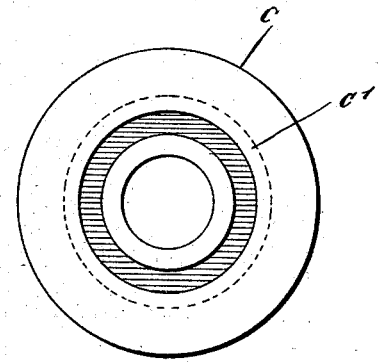

Figure 1 is a side elevation of the improvement as applied on a vehicle-axle, parts being shown in section. Fig. 2 is a cross-section of the same on the line 2 2 of Fig. 1, and Fig. 3 is an inner face view of the axle-nut.

The spindle A, as shown in Figs. 1 and 2, is formed with a longitudinally-extending groove A', into which fits a bar B, provided on its outer end with a head B', adapted to engage an annular groove C' formed in the nut C, screwing on the threaded portion $A^2$ of the spindle A. The groove A' is somewhat deeper at the small end of the spindle A than at the base thereof, and the bar B is made correspondingly tapering to properly fit the said groove, as indicated in Fig. 1.

The device is used as follows: When it is desired to apply a lubricant in the form of grease or like material to the spindle A, the nut C is first unscrewed, and in doing so the bar B is partly drawn out, and when finally the nut disengages the threaded part $A^2$ then a further pull on the nut will completely withdraw the bar B. The lubricant is then applied to the bar, and the bar B is again pushed back into the groove, and the nut C is finally screwed up, to drive the bar home. Now, in doing so, the bar B presses the lubricant in contact with the journal or box in the hub of the wheel, so that a proper lubrication of the contacting parts takes place.

Having thus fully described our invention, we claim as new and desire to secure by Letters Patent—

1. The combination with a spindle formed with a longitudinally extending groove, of a bar engaging the said groove and provided with a head, and a nut screwing on the spindle and carrying the said bar, substantially as shown and described.

2. A lubricator, provided with a bar adapted to engage a groove in the spindle and provided with a head, and a nut formed with an annular groove loosely engaging the head of the said bar, substantially as shown and described.

3. The combination, with a spindle provided with a longitudinal tapering groove, of a tapering bar fitting in the groove and provided with a head, and a nut on the spindle and provided with an annular groove into which the head of the bar projects, substantially as described.

JAMES C. WHISMAN.
LOUIS F. GERDING.

Witnesses:
GUY C. BARR,
CLINT C. COLLINS.